(12) United States Patent
Ziegler

(10) Patent No.: US 7,894,568 B2
(45) Date of Patent: Feb. 22, 2011

(54) ENERGY DISTRIBUTION RECONSTRUCTION IN CT

(75) Inventor: Andy Ziegler, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 425 days.

(21) Appl. No.: 11/911,212

(22) PCT Filed: Apr. 4, 2006

(86) PCT No.: PCT/IB2006/051068

§ 371 (c)(1),
(2), (4) Date: Oct. 11, 2007

(87) PCT Pub. No.: WO2006/109227

PCT Pub. Date: Oct. 19, 2006

(65) Prior Publication Data

US 2009/0268862 A1    Oct. 29, 2009

(30) Foreign Application Priority Data

Apr. 14, 2005    (EP) .................................. 05102971

(51) Int. Cl.
*A61B 6/00* (2006.01)

(52) U.S. Cl. ............................................. 378/5; 378/57

(58) Field of Classification Search ...................... 378/5, 378/57

See application file for complete search history.

(56) References Cited

U.S. PATENT DOCUMENTS

| | | | | |
|---|---|---|---|---|
| 3,808,444 A | * | 4/1974 | Schneeberger et al. | 378/57 |
| 4,789,930 A | * | 12/1988 | Sones et al. | 378/207 |
| 5,060,249 A | * | 10/1991 | Eisen et al. | 378/57 |
| 5,179,581 A | * | 1/1993 | Annis | 378/57 |
| 5,530,248 A |  | 6/1996 | Natanzon et al. |  |
| 5,565,684 A |  | 10/1996 | Gullberg et al. |  |
| 5,602,891 A | * | 2/1997 | Pearlman | 378/62 |
| 5,974,111 A | * | 10/1999 | Krug et al. | 378/57 |
| 6,018,562 A | * | 1/2000 | Willson | 378/9 |
| 6,026,143 A | * | 2/2000 | Simanovsky et al. | 378/57 |

(Continued)

OTHER PUBLICATIONS

Bert, C., et al.; Computerized tomography using the Medipix1 chip; 2003; Nuclear Instruments 7 Methods in Physics Research, Section-A: Accelerators, Spectrometers, Detectors and Associated Equipment; Elsevier; 509(103)240-250.

Fessler, J. A., et al.; Maximum-likelihood dual-energy tomographic image reconstruction; 2002; Proc. of SPIE-Intl. Soc. for Optical Engineering; vol. 4684; pp. 38-49.

Harding, G.; X-ray scatter tomography for explosives detection; 2004; Radiation Physics and Chemistry; Elsevier; 71(3-4)869-881.

Kudo, H., et al.; Newton-SOR Method for Fast Statistical Tomographic Image Reconstruction; 2003; Systems and Computers in Japan; 34(4)1-11.

*Primary Examiner*—Edward J Glick
*Assistant Examiner*—Alexander H Taningco

(57) ABSTRACT

The reconstruction of the energy distribution at a detector with a detector element that consists of many small pixels, which count the number of photons above certain thresholds, is performed with a Maximum Likelihood analysis, according to an aspect of the present invention. Thus, the reconstruction scheme may use the redundancy in the measurement and may treat the Poisson statistics accordingly.

20 Claims, 3 Drawing Sheets

U.S. PATENT DOCUMENTS

| | | | |
|---|---|---|---|
| 6,236,709 B1 * | 5/2001 | Perry et al. | 378/57 |
| 6,507,633 B1 * | 1/2003 | Elbakri et al. | 378/8 |
| 6,754,298 B2 * | 6/2004 | Fessler | 378/4 |
| 2002/0106051 A1 * | 8/2002 | Menhardt | 378/4 |
| 2004/0101104 A1 * | 5/2004 | Avinash et al. | 378/98.12 |
| 2005/0117700 A1 * | 6/2005 | Peschmann | 378/57 |
| 2005/0171923 A1 * | 8/2005 | Kiiveri et al. | 707/1 |
| 2008/0095305 A1 * | 4/2008 | Ziegler et al. | 378/8 |

* cited by examiner

ENERGY DISTRIBUTION RECONSTRUCTION IN CT

The invention relates to the field of X-ray imaging. In particular, the invention relates to a computer tomography apparatus, to a method of examining an object of interest with a computer tomography apparatus, to a computer-readable medium and to a program element.

Over the past several years, X-ray baggage inspections have evolved from simple X-ray imaging systems that were completely dependent on interaction by an operator to more sophisticated automatic systems that can automatically recognize certain types of materials and trigger an alarm in the presence of dangerous materials. An inspection system has employed an X-ray radiation source for emitting X-rays which are transmitted through or scattered from the examined package to a detector.

Computed tomography (CT) is a process of using digital processing to generate a three-dimensional image of the internals of an object from a series of two-dimensional X-ray images taken around a single axis of rotation. The reconstruction of CT images can be done by applying appropriate algorithms. An imaging technique based on coherently scattered X-ray photons or quanta is the so-called "coherent scatter computer tomography" (CSCT). CSCT is a technique that produces images of (particularly the low angle) scatter properties of an object of interest. These depend on the molecular structure of the object, making it possible to produce material-specific maps of each component. The dominant component of low angle scatter is coherent scatter. Since coherent scatter spectra depend on the atomic arrangement of the scattering sample, coherent scatter computer tomography is a sensitive technique for imaging spatial variations in the molecular structure of baggage or of biology tissue across a two-dimensional object section.

It may be desirable to have a reliable CT/CSCT system.

The invention relates to a computer tomography apparatus, a method of examining an object of interest with a computer tomography apparatus, a computer-readable medium and a program element with the features according to the independent claims.

According to an exemplary embodiment of the present invention, a computer tomography apparatus for examination of an object of interest may be provided, the computer tomography apparatus comprising a detector element adapted for detecting a first radiation with a first energy above a first energy threshold and a second radiation with a second energy above a second energy threshold, resulting in detection data, and a reconstruction unit adapted for reconstructing an energy distribution on the basis of a statistical analysis of the detection data.

According to this exemplary embodiment of the present invention, the energy distribution reconstructed on the basis of a statistical analysis of the detected photons may exhibit an improved quality. This may yield to an improved image reconstruction. A CT/CSCT system may use energy-resolved and counting detectors.

Furthermore, since the reconstruction of the energy distribution is performed on the basis of a statistical analysis of the detection data, and not on the basis of a purely deterministic analysis, photon statistics may be taken into account allowing the use of energy information for each photon individually.

According to another exemplary embodiment of the present invention, the reconstruction unit is adapted for reconstructing the energy distribution on the basis of a Maximum Likelihood analysis of the detection data. A statistical analysis on the basis of "Maximum Likelihood" may involve a reconstruction scheme which may allow for an improved sensitivity. On the basis of a derived Log-Likelihood function, the energy information and the position information (e.g. for CSCT) of each individual photon may, according to another exemplary embodiment of the present invention, be considered individually.

By using a high amount of available information, namely the information of each of the scattered or attenuated photons individually, a maximum of information may be derived from a measurement, and thus the accuracy of a computer tomography analysis may be increased.

It should be noted, that the method of the invention may be valid for any trajectory, detector shape, beam geometry (e.g. fan-beam, cone-beam, etc.), and that it may support an energy-dependent attenuation map.

According to another exemplary embodiment of the present invention, the first energy threshold is different from the second energy threshold. Thus, a distinction may be made between photons which impinge on the detector element and which have an energy above the first energy threshold and photons impinging on the detector element and having an energy above the second (and different) energy threshold.

These photons may be, according to another exemplary embodiment of the present invention, individually counted and the respective counted numbers may be used for a following statistical analysis, resulting in a good energy distribution reconstruction and therefore in a good image quality.

According to another exemplary embodiment of the present invention, the detector element comprises a first pixel with a first energy threshold adapted for detecting the first radiation and a second pixel with a second energy threshold adapted for detecting the second radiation. The detector element may consist of a plurality of different pixels, each counting photons above respective energy thresholds, thus improving the detection data.

According to another exemplary embodiment of the present invention, the first pixel further comprises a third energy threshold and the second pixel further comprises a fourth energy threshold. Beside detecting the first radiation, the first pixel may be adapted for detecting a third radiation, wherein the third radiation has a third energy above the third energy threshold. Beside detecting the second radiation, the second pixel may further be adapted for detecting a fourth radiation, wherein the fourth radiation has a fourth energy above the fourth energy threshold. This may, e.g., provide for an inclusion of detector effects in the reconstruction itself.

Furthermore, according to still another exemplary embodiment of the present invention, the detector element is adapted for detecting a single first photon of the first radiation and a single second photon of the second radiation, wherein an energy of the first photon is above the first energy threshold and wherein an energy of the second photon is above the second energy threshold. Furthermore, the detector element is adapted for counting a first number of detected single first photons and for counting a second number of detected single second photons. The detection of single individual photons together with their respective minimum energy may yield, together with a following statistical analysis on the basis of photon statistics, to a good energy distribution reconstruction and to a good image quality.

The invention can be applied in coherent scatter computed tomography for single-slice detectors and for multi-slice detectors, particularly where at least a part of the detector is energy-resolved.

Thus, the invention may be related to CSCT/CT devices in which images are reconstructed by taking into account measurements of at least some individual photon statistics (position and energy) and wherein images are reconstructed using the measurements and a Maximum Likelihood scheme.

The computer tomography apparatus may comprise an electromagnetic radiation source adapted for emitting electromagnetic radiation to an object of interest and a collimator arranged between the electromagnetic radiation source and the detecting elements, wherein the collimator is adapted for collimating an electromagnetic radiation beam emitted by the electromagnetic radiation source to form a fan-beam or a cone-beam, or a beam of any other desired geometry. The detecting elements of the computer tomography apparatus may form a single-slice detector array, or alternatively a multi-slice detector array. The single-slice detector array may have the advantage of a simple configuration and a fast evaluation of the detected signals. However, a multi-slice detector array may be implemented to achieve a particularly high resolution of the detected signals, and a high amount of detected signals.

The computer tomography apparatus according to the invention may be applied as a baggage inspection apparatus, a medical application apparatus, a material testing apparatus or a material science analysis apparatus. A preferred field of application of the invention may be baggage inspection, since the defined functionality of the invention allows a secure and reliable analysis of the content of a baggage item allowing to detect suspicious content, even allowing to determine the type of a material inside such a baggage item.

Such an apparatus or method in accordance with an exemplary embodiment of the present invention may create a high quality automatic system that may automatically recognize certain types of materials and, if desired, trigger an alarm in the presence of dangerous material. Such an inspection system may have employed the computer tomography apparatus of the invention with an X-ray radiation source for emitting X-rays which are transmitted through or scattered from the examined package to a detector allowing to detect coherently scattered radiation in an energy-resolved manner.

Furthermore, according to another exemplary embodiment of the present invention, a method of examining an object of interest with a computer tomography apparatus is provided, the method comprising the steps of detecting a first radiation with a first energy above a first energy threshold, detecting a second radiation with a second energy above a second energy threshold, resulting in detection data, and reconstructing an energy distribution on the basis of a statistical analysis of the detection data.

It is believed that this may allow for an improved energy distribution reconstruction of the detection data.

According to another exemplary embodiment of the present invention, a computer-readable medium may be provided, in which a computer program of examining an object of interest with a computer tomography apparatus is stored which, when being executed by a processor, is adapted to carry out the above-mentioned method steps. Furthermore, a program element of examining an object of interest may be provided, which, when being executed by a processor, is adapted to carry out the above-mentioned method steps.

The examination of an object of interest according to the invention may be realized by a computer program, i.e. by software, or by using one or more special electronic optimization circuits, i.e. in hardware, or in hybrid form, i.e. by means of software components and hardware components.

It may be seen as the gist of an exemplary embodiment of the present invention that energy resolved and counting detectors are used, which are adapted as a cluster of pixels with a different threshold.

These and other aspects of the present invention will become readily apparent from and elucidated with reference to the embodiments described hereinafter.

Exemplary embodiments of the present invention will be described in the following, with reference to the following drawings.

The illustration in the drawings is schematically. In different drawings, similar or identical elements are provided with the same reference signs.

Figure 1:
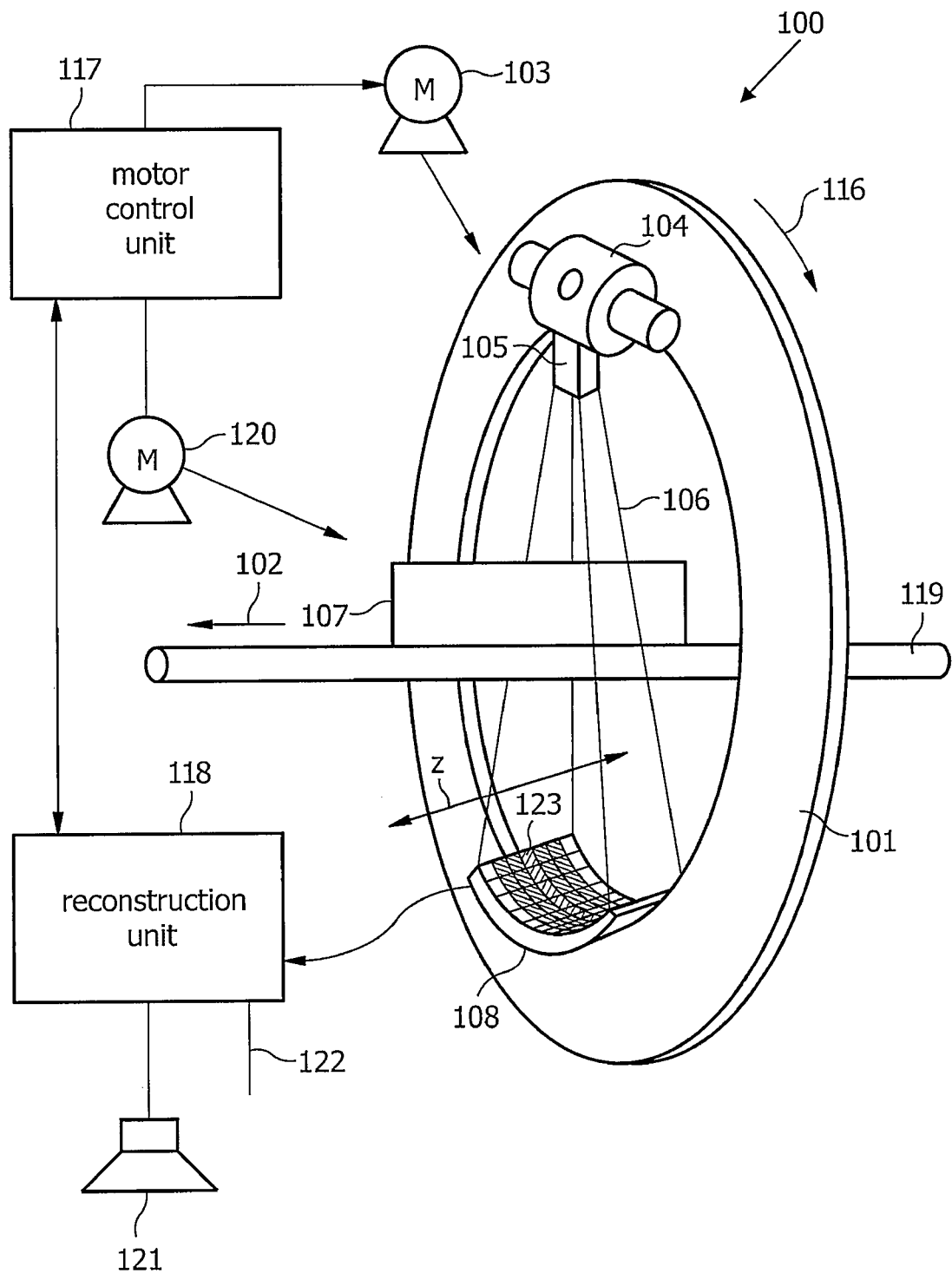
FIG. 1 shows a computer tomography apparatus according to an exemplary embodiment of the present invention.

FIG. 1 shows an exemplary embodiment of a CSCT scanner system according to an exemplary embodiment of the present invention. With reference to this exemplary embodiment, the present invention will be described for the application in baggage inspection to detect hazardous materials, such as explosives, in items of baggage. However, it should be noted that the present invention is not limited to this application, but may also be applied in the field of medical imaging, or other industrial applications, such as material testing.

The computer tomography apparatus 100 depicted in FIG. 1 is a cone-beam CT scanner. However, the invention may also be carried out a with a fan-beam geometry. The CT scanner depicted in FIG. 1 comprises a gantry 101, which is rotatable around a rotational axis 102. The gantry 101 is driven by means of a motor 103. Reference numeral 104 designates a source of radiation such as an X-ray source, which, according to an aspect of the present invention, emits a polychromatic radiation.

Reference numeral 105 designates an aperture system which forms the radiation beam emitted from the radiation source to a cone-shaped radiation beam 106. The cone-beam 106 is directed such that it penetrates an object of interest 107 arranged in the centre of the gantry 101, i.e. in an examination region of the CSCT scanner, and impinges onto the detector 108. As may be taken from FIG. 1, the detector 108 is arranged on the gantry 101 opposite to the source of radiation 104, such that the surface of the detector 108 is covered by the cone-beam 106. The detector 108, which is depicted in FIG. 1, comprises a plurality of detector elements 123 each capable of detecting, in an energy-resolving manner (in the meaning that they comprise a plurality of pixels, wherein each pixel has a certain predetermined energy threshold and is adapted for detecting and counting photons with energies above that certain predetermined energy threshold and, for example, for further detecting and counting photons which energy is below the predetermined energy threshold) X-rays or individual photons which have been coherently scattered by the object of interest 107.

During a scan of the object of interest 107, the source of radiation 104, the aperture system 105 and the detector 108 are rotated along the gantry 101 in the direction indicated by arrow 116. For rotation of the gantry 101 with the source of radiation 104, the aperture system 105 and the detector 108, the motor 103 is connected to a motor control unit 117, which is connected to a calculation or determination unit 118.

In FIG. 1, the object of interest 107 is an item of baggage which is disposed on a conveyor belt 119. During the scan of the object of interest 107, while the gantry 101 rotates around the item of baggage 107, the conveyor belt 119 displaces the object of interest 107 along a direction parallel to the rotational axis 102 of the gantry 101. By this, the object of interest 107 is scanned along a helical scan path. The conveyor belt 119 may also be stopped during the scans to thereby measure signal slices. Instead of providing a conveyor belt 119, for example, in medical applications where the object of interest 107 is a patient, a movable table may be used. However, it should be noted that in all of the described cases it may also be possible to perform a circular scan, where there is no displacement in a direction parallel to the rotational axis 102, but only the rotation of the gantry 101 around the rotational axis 102.

Further, it shall be emphasized that, as an alternative to the cone-beam configuration shown in FIG. 1, the invention may be realized by a fan-beam configuration. In order to generate a primary fan-beam, the aperture system 105 may be configured as a slit collimator.

The detector 108 may be connected to the determination unit 118. The determination unit 118 may receive the detection result, i.e. the read-outs from the detector elements 123 of the detector 108 and may determine a scanning result on the basis of the read-outs. Furthermore, the determination unit 118 communicates with the motor control unit 117 in order to coordinate the movement of the gantry 101 with motors 103 and 120 with the conveyor belt 119.

The determination 118 may be adapted for constructing an image from read-outs of the detector 108 using a statistical method according to an exemplary embodiment of the present invention. A reconstructed image generated by the calculation unit 118 may be output to a display (not shown in FIG. 1) via an interface 122.

The determination unit 118 may be realized by a data processor to process read-outs from the detector elements 123 of the detector 108.

Furthermore, as may be taken from FIG. 1, the determination unit 118 may be connected to a loudspeaker 121, for example, to automatically output an alarm in case of the detection of suspicious material in the item of baggage 107.

The computer tomography apparatus 100 for examination of the object of interest 107 includes the detector 108 having the plurality of detecting elements 123 arranged in a matrix-like manner, each being adapted to detect X-rays coherently scattered from the object of interest 107 in a threshold-based and thus energy-resolved manner. Furthermore, the computer tomography apparatus 100 comprises the determination unit or reconstruction unit 118 adapted for reconstructing an energy distribution on the basis of a statistical analysis of the detected data. In particular, the reconstruction unit 118 reconstructs the energy distribution on the basis of a Maximum Likelihood analysis of the detection data. In the frame of this evaluation, structural information concerning the object of interest 107 may be determined by the reconstruction unit 118 under further consideration of experimentally pre-known values of an absorption coefficient.

The computer tomography apparatus 100 comprises the X-ray source 104 adapted to emit X-rays to the object of interest 107. The collimator 105 provided between the electromagnetic radiation source 104 and the detecting elements 123 is adapted to collimate an electromagnetic radiation beam emitted from the electromagnetic radiation source 104 to form a cone-beam. Alternatively, not shown in FIG. 1, a slit collimator may be used instead of collimator 105 to produce a fan-beam. The detecting elements 123 form a multi-slice detector array 108. The computer tomography apparatus 100 is configured as a baggage inspection apparatus.

Figure 2:
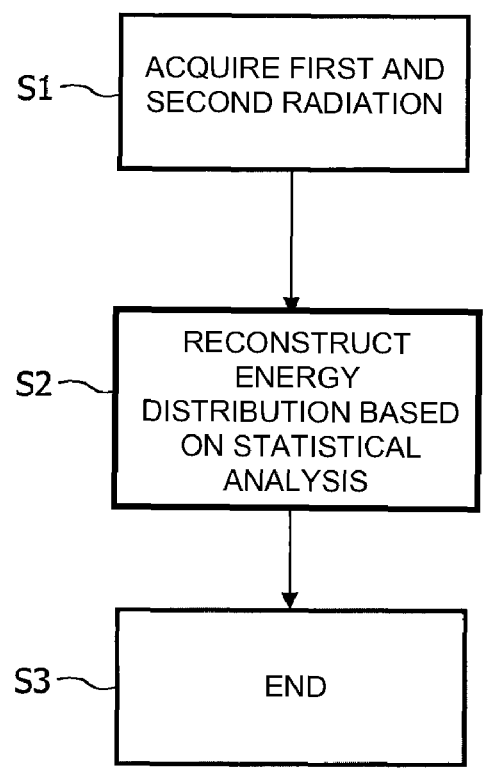
FIG. 2 shows a flow-chart of an exemplary embodiment of a method of examining an object of interest according to the present invention.

In the following, referring to FIG. 2, the statistical analysis carried out by the reconstruction unit 118 will be described in more detail.

The method starts at step S1 with the acquisition of detection data. The detector element for data acquisition may, according to an exemplary embodiment of the present invention, consist of several small pixels, wherein each pixel measures the number of photons above certain thresholds (or e.g. below certain thresholds). The thresholds may be chosen differently for each pixel, which enables the reconstruction of the energy distribution. Since the measurements may have a redundancy, the reconstruction with Maximum Likelihood may perform very accurately.

According to an exemplary embodiment of the present invention, the data acquisition performed in step S1 comprises a detection of a number of first photons and a counting of the detected first photons, where each of the first photons has an energy above a first threshold. Furthermore, the acquisition step S1 comprises a detection of second photons having an energy above a second threshold (which is different from the first threshold) and a counting of the number of the second photons. Detection of the first photons may be performed by a first pixel of the detecting element and detection of the second photons is performed by a second pixel of the detecting element (which may be the same pixel as the first pixel). Accordingly, third and fourth pixels may be provided in the detecting element, detecting and counting third and fourth photons with energies above (or below) third and fourth thresholds, respectively.

Furthermore, according to another exemplary embodiment of the present invention, the first pixel may be adapted for detecting the first and the second photons (with energies above the first and the second threshold, respectively) and the second pixel may be adapted for detecting the third and fourth photons (with energies above the third and the fourth threshold, respectively). According to an exemplary embodiment of the present invention, each detector element of a detector may count a first number of photons with an energy above the first threshold and a second number of photons with an energy above a second threshold, wherein the second threshold may vary from detector element to detector element.

It should be noted, that the method may be extended to a more complicated setup of thresholds and offers the possibility to include detector effects in the reconstruction itself.

In other words, one detector element is divided into N−1 different pixels with different energy thresholds and therefore measures an energy distribution in N bins. Each pixel, i, measures the number of photons above two different thresholds ($y_{1,i}$ for the first threshold and $y_{2,i}$ for the second threshold), thus the number of photons above the second threshold ($x_{a,i}=y_{2,i}$) and below the second threshold ($x_{b,i}=y_{2,i}-y_{1,i}$) are known. The number of photons, which is measured, follows a Poisson distribution which reads $$P(\mu \mid x) = \frac{e^{-\mu}\mu^x}{x!}$$

with mean value, $\mu$.

After the acquisition of the detection data, a reconstruction unit performs a reconstruction of an energy distribution on the basis of a statistical analysis of the detection data. According to an aspect of the present invention, this statistical analysis is based on a Maximum Likelihood analysis, in particular on a Log-Likelihood analysis, of the detection data in step S2.

According to an aspect of the present invention, the Maximum Likelihood analysis may be maximized on the basis of Newton's Quadratic Approximation and a Line Search.

If the number of photons in each bin j, which has to be determined, is $\mu j$, then the Maximum Likelihood function, L, is given by $$L = P(\mu_1 \mid x_{b,1}) \cdot P(\mu_2 + \mu_3 + \ldots + \mu_N \mid x_{a,1}) \cdot$$
$$P(\mu_1 + \mu_2 \mid x_{b,2}) \cdot P(\mu_3 + \mu_4 + \ldots + \mu_N \mid x_{a,2}) \cdot$$
$$\vdots$$
$$P(\mu_1 + \mu_3 + \ldots + \mu_{N-1} \mid x_{b,N-1}) \cdot P(\mu_N \mid x_{a,N-1})$$

The Log-Likelihood function reads $$l = \log L$$
$$= -\mu_1 + x_{b,1} \log \mu_1 - (\mu_2 + \mu_3 + \ldots + \mu_N) +$$
$$x_{a,1} \log(\mu_2 + \mu_3 + \ldots + \mu_N)$$
$$\vdots$$
$$= -(N-1) \sum_{j=1}^{N} \mu_j + \sum_{i=1}^{N-1} \left( x_{b,i} \log\left( \sum_{j=1}^{i} \mu_j \right) + x_{b,i} \log\left( \sum_{j=i+1}^{N} \mu_j \right) \right)$$

This Log-Likelihood may be maximized by using Newton's Quadratic Approximation and a Line Search. Then, the iterative update, n→n+1, for the vector, $\mu$, of all energy bins, $\mu_j$ is given by $$\mu^{(n+1)} = \mu^{(n)} - \alpha [\nabla^2 L(\mu^n)]^{-1} \nabla L(\mu^n),$$

where $0 < \alpha \leq 1$ is the line search parameter and chosen in such a way, that it forces the update to increase the Likelihood. The Gradient and Hessian are $$\frac{\partial L}{\partial \mu_k} = -2(N-1) + \sum_{i=1}^{N-1} \begin{cases} \dfrac{x_{b,i}}{\sum_{j=1}^{i} \mu_j} & k \leq i \\ \dfrac{x_{b,i}}{\sum_{j=i+1}^{N} \mu_j} & k > i \end{cases}$$

and $$\frac{\partial^2 L}{\partial \mu_l \partial \mu_k} = \sum_{i=1}^{N-1} \begin{cases} \dfrac{x_{b,i}}{\left(\sum_{j=1}^{i} \mu_j\right)^2} & k \leq i \\ \dfrac{x_{b,i}}{\left(\sum_{j=i+1}^{N} \mu_j\right)^2} & k > i. \end{cases}$$

The method according to the present invention ends at step S3.

Figure 3:
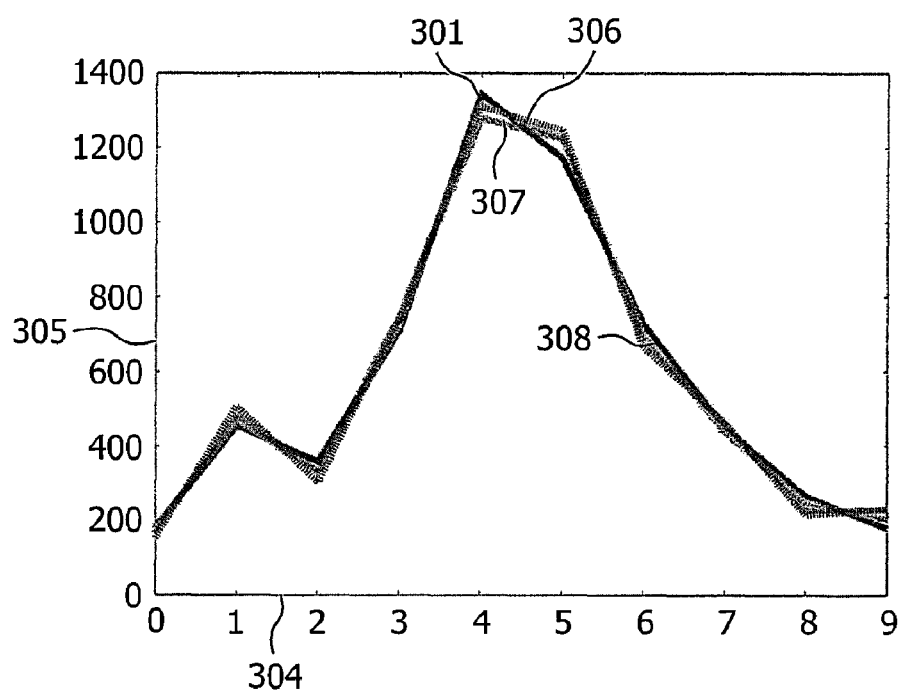
FIG. 3 shows an assumed energy distribution which is reconstructed according to standard reconstruction schemes and, and which is reconstructed on the basis of a Maximum Likelihood analysis.

FIG. 3 shows an assumed energy distribution 301 which is reconstructed according to reconstruction schemes 306 and 307, and which is reconstructed on the basis of a Maximum Likelihood analysis 308.

The horizontal axis 304 shows the respective energy bin into which the counted photon is classified and the vertical axis 305 shows the number of counted photons for each bin.

As may be seen from FIG. 3 and in particular from Table 1, the energy distribution reconstruction according to the present invention 308 may yield to a far better and accurate energy distribution than other energy distribution reconstruction schemes 306 or 307.

First, an energy distribution in 10 energy bins has been assumed. Then, 58500 photons have been simulated according to the assumed distribution, resulting in curve 301. Then, the measured number of photons (for each detector element or pixel) has been transformed into an energy distribution 306 on the basis of a pseudo inverse procedure, which is an analytical procedure for solving an over-determined set of equations. A regulation may be used as a free parameter, resulting in a smoothing 307.

TABLE 1

Comparison of simulated energy distribution with pseudo inverse energy distribution (PI), regulated pseudo inverse energy distribution (PI r.), ML reconstruction.

|  | $\chi^2$ |
| --- | --- |
| ML | 12 |
| PI | 57 |
| PI r. | 35 |

In Table 1, the simulated energy distribution 301 is compared to the pseudo inverse energy distribution (PI) 306, to the regulated pseudo inverse energy distribution (PI r) 307, and to the ML reconstruction 308, by calculating a $\chi^2$ deviation from the simulated distribution. As can be seen from Table 1, the $\chi^2$ deviation is 12 for the ML reconstruction 308 (which is the lowest value), 57 for the pseudo inverse energy distribution (PI) 306 and 35 for the regulated pseudo inverse energy distribution (PI r) 307.

The above reconstruction scheme according to the present invention may be performed with data acquired by all kinds of energy-resolved and counting detectors, which, for example, consist of a cluster of pixels with different thresholds.

Furthermore, since the number of measured data is small compared to Maximum Likelihood image reconstruction, the maximization may be fast and can be done on line.

Figure 4:
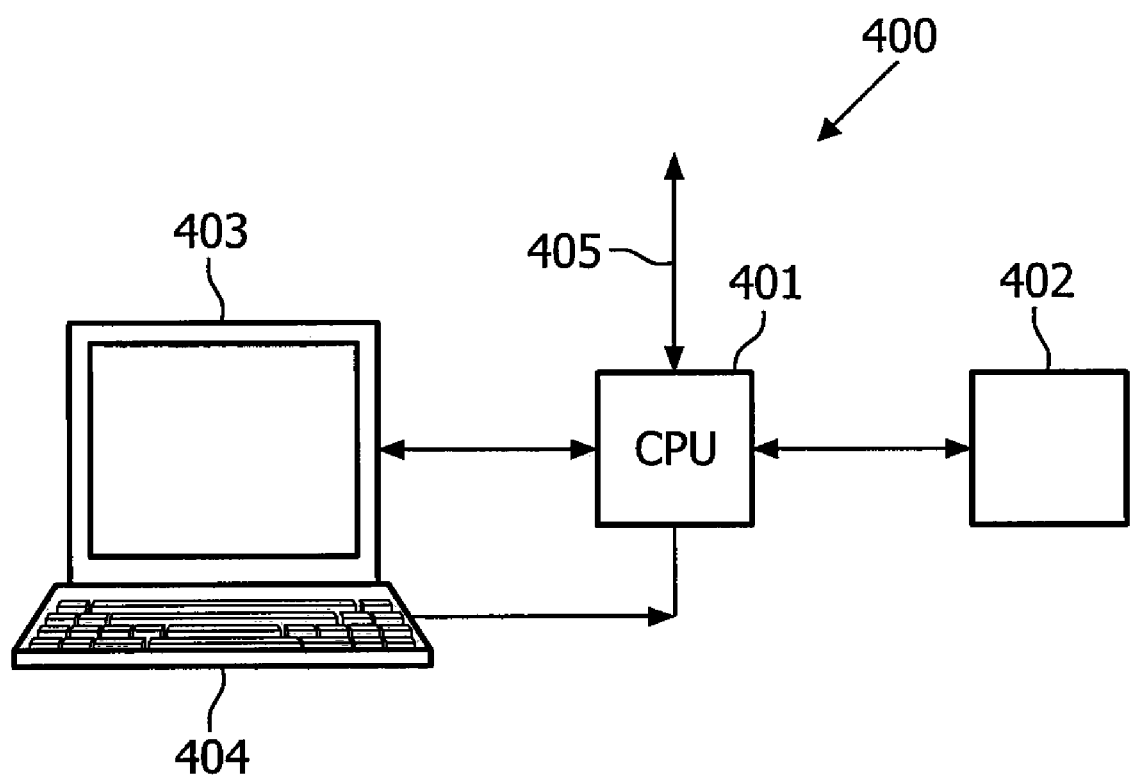
FIG. 4 shows an exemplary embodiment of a data processing device to be implemented in the computer tomography apparatus of the invention.

FIG. 4 depicts an exemplary embodiment of a data processing device 400 according to the present invention for executing an exemplary embodiment of a method in accordance with the present invention. The data processing device 400 depicted in FIG. 4 comprises a central processing unit (CPU) or image processor 401 connected to a memory 402 for storing an image depicting an object of interest, such as a patient or an item of baggage. The data processor 401 may be connected to a plurality of input/output network or diagnosis devices, such as a CT device. The data processor 401 may furthermore be connected to a display device 403, for example, a computer monitor, for displaying information or an image computed or adapted in the data processor 401. An operator or user may interact with the data processor 401 via a keyboard 404 and/or other output devices, which are not depicted in FIG. 4. Furthermore, via the bus system 405, it may also be possible to connect the image processing and control processor 401 to, for example, a motion monitor, which monitors a motion of the object of interest. In case, for example, a lung of a patient is imaged, the motion sensor may be an exhalation sensor. In case the heart is imaged, the motion sensor may be an electrocardiogram.

Exemplary technical fields, in which the present invention may be applied advantageously, include baggage inspection, medical applications, material testing, and material science.

An improved image quality and a reduced amount of calculation in combination with a low effort may be achieved. Also, the invention may be applied in the field of heart scanning to detect heart diseases.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A computer tomography apparatus for examination of an object of interest, the computer tomography apparatus comprising:
   a detector element comprising at least a first pixel adapted for detecting a first radiation with a first energy above a first energy threshold and at least a second pixel adapted for detecting a second radiation with a second energy above a second energy threshold, resulting in detection data; and
   a reconstruction unit that reconstructs an energy distribution on the basis of a statistical analysis of the detection data.

2. The computer tomography apparatus of claim 1,
   wherein the reconstruction unit is adapted for reconstructing the energy distribution on the basis of a Maximum Likelihood analysis of the detection data.

3. The computer tomography apparatus of claim 2,
   wherein the Maximum Likelihood analysis is maximized on the basis of Newton's Quadratic Approximation and a Line Search.

4. The computer tomography apparatus of claim 1,
   wherein the reconstruction unit is adapted for reconstructing the energy distribution on the basis of a Log-Likelihood analysis of the detection data.

5. The computer tomography apparatus of claim 1,
   wherein the first energy threshold is different from the second energy threshold.

6. The computer tomography apparatus of claim 1,
   wherein the first pixel further comprises a third energy threshold;
   wherein the second pixel further comprises a fourth energy threshold;
   wherein the first pixel is further adapted for detecting a third radiation with a third energy above the third energy threshold; and
   wherein the second pixel is further adapted for detecting a fourth radiation with a fourth energy above the fourth energy threshold.

7. The computer tomography apparatus of claim 1,
   wherein the first pixel of the detector element is adapted for detecting a single first photon of the first radiation and the second pixel of the detector element is adapted for detecting a single second photon of the second radiation;
   wherein an energy of the first photon is above the first energy threshold;
   wherein an energy of the second photon is above the second energy threshold; and
   wherein the first pixel of the detector element is adapted for counting a first number of detected single first photons and the second pixel of the detector element is adapted for counting a second number of detected single second photons.

8. The computer tomography apparatus of claim 1,
   wherein the first pixel of the detector element is adapted for detecting a single third photon and the second pixel of the detector element is adapted for detecting a single fourth photon;
   wherein an energy of the single third photon is below the first energy threshold;
   wherein an energy of the single fourth photon is below the second energy threshold; and
   wherein the first pixel of the detector element is adapted for counting a third number of detected single third photons and the second pixel of the detector element is adapted for counting a fourth number of detected single fourth photons.

9. The computer tomography apparatus of claim 1,
   wherein the computer tomography apparatus is adapted as a coherent scatter computer tomography apparatus.

10. The computer tomography apparatus of claim 1, further comprising:
    an electromagnetic radiation source adapted for emitting electromagnetic radiation to an object of interest; and
    a collimator arranged between the electromagnetic radiation source and the detecting elements;
    wherein the collimator is adapted for collimating an electromagnetic radiation beam emitted by the electromagnetic radiation source to form a fan-beam or a cone-beam.

11. The computer tomography apparatus of claim 1,
    wherein the detecting elements form a single-slice detector array.

12. The computer tomography apparatus of claim 1,
    wherein the detecting elements form a multi-slice detector array.

13. The computer tomography apparatus of claim 1, configured as one of the group consisting of a baggage inspection apparatus, a medical application apparatus, a material testing apparatus and a material science analysis apparatus.

14. A method of examining an object of interest with a computer tomography apparatus, the method comprising the steps of:
    detecting with a first pixel of a detector element a first radiation with a first energy above a first energy threshold;
    detecting with a second pixel of the same detector element a second radiation with a second energy above a second energy threshold; and
    reconstructing an energy distribution on the basis of a statistical analysis of the detection data;
    wherein the detection of the first radiation and the detection of the second radiation results in detection data.

15. The method of examining an object of interest with a computer tomography apparatus of claim 14,
    wherein the reconstruction unit is adapted for reconstructing the energy distribution on the basis of a Maximum Likelihood analysis of the detection data.

16. The method of examining an object of interest with a computer tomography apparatus of claim 14,
    wherein the reconstruction unit is adapted for reconstructing the energy distribution on the basis of a Log-Likelihood analysis of the detection data.

17. The method of examining an object of interest with a computer tomography apparatus of claim 14,
    wherein the first energy threshold is different from the second energy threshold.

18. The method of examining an object of interest with a computer tomography apparatus of claim 17,
- wherein the first pixel further comprises a third energy threshold;
- wherein the second pixel further comprises a fourth energy threshold;
- wherein the first pixel is further adapted for detecting a third radiation with a third energy above the third energy threshold; and
- wherein the second pixel is further adapted for detecting a fourth radiation with a fourth energy above the fourth energy threshold.

19. The method of examining an object of interest with a computer tomography apparatus of claim 14,
- wherein the first pixel of the detector element is adapted for detecting a single first photon of the first radiation and the second pixel of the detector element is adapted for detecting a single second photon of the second radiation;
- wherein an energy of the first photon is above the first energy threshold;
- wherein an energy of the second photon is above the second energy threshold; and
- wherein the first pixel of the detector element is adapted for counting a first number of detected single first photons and the second pixel of the detector element is adapted for counting a second number of detected single second photons.

20. A non-transient computer-readable medium, in which a computer program of examining an object of interest with a computer tomography apparatus is stored which, when being executed by a processor, is adapted to carry out the steps of:
- detecting with a first pixel of a detector element a first radiation with a first energy above a first energy threshold;
- detecting with a second pixel of the same detector element a second radiation with a second energy above a second energy threshold; and
- reconstructing an energy distribution on the basis of a statistical analysis of the detection data;
- wherein the detection of the first radiation and the detection of the second radiation results in detection data.

\* \* \* \* \*